Dec. 26, 1944.  H. T. FARR ET AL  2,365,944
METHOD FOR ALIGNING ROLL PASSES
Filed Aug. 5, 1942   3 Sheets-Sheet 1
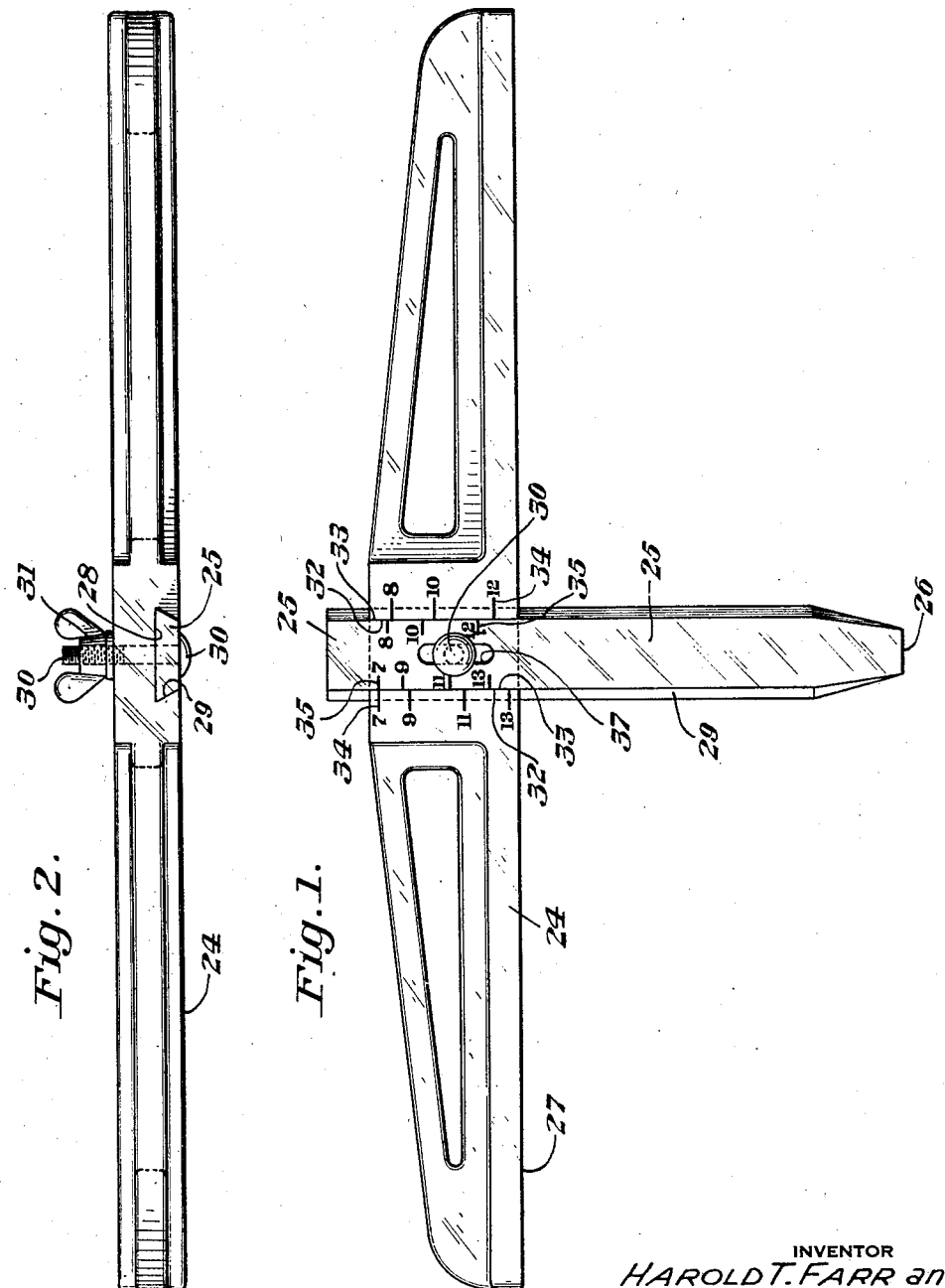
INVENTOR
HAROLD T. FARR and
ROBERT A. PETERSON
by John E. Jackson
their Attorney

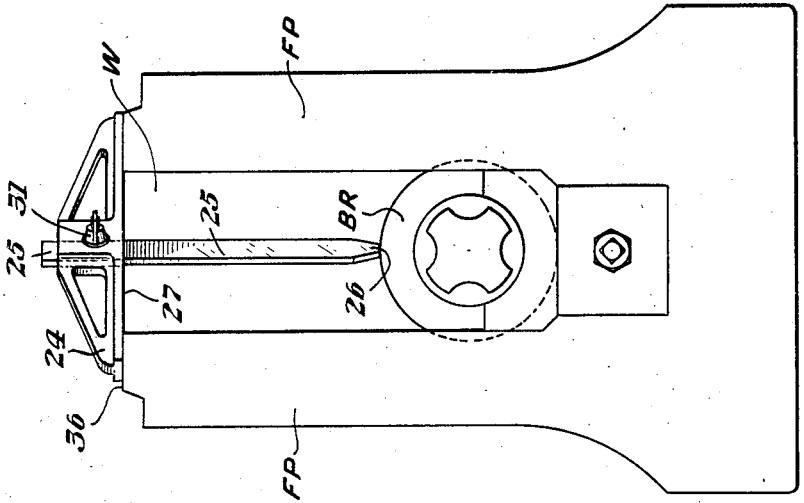
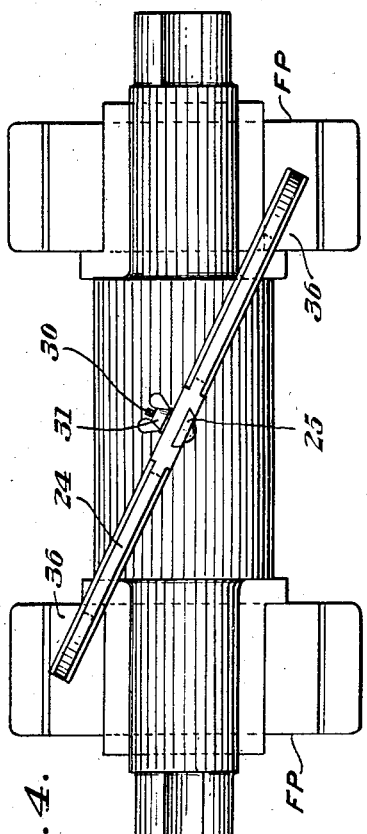
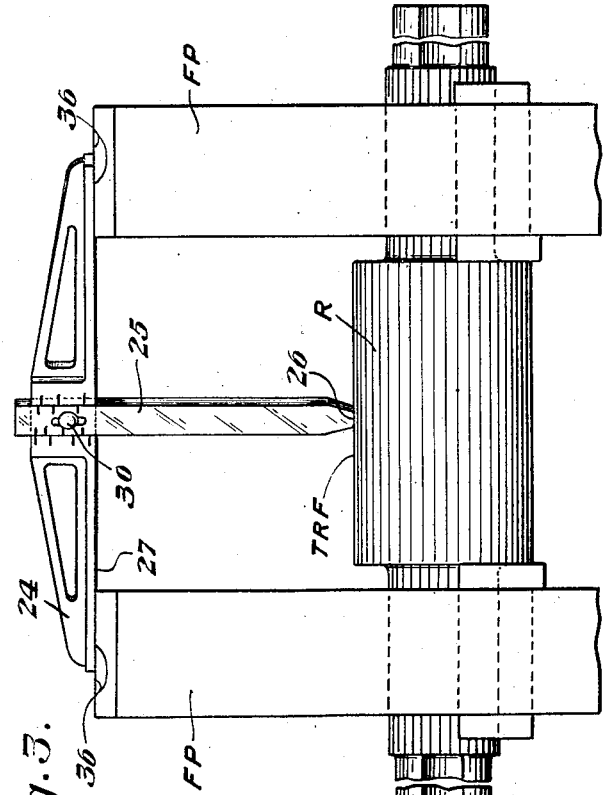

Dec. 26, 1944.  H. T. FARR ET AL  2,365,944
METHOD FOR ALIGNING ROLL PASSES
Filed Aug. 5, 1942  3 Sheets-Sheet 3
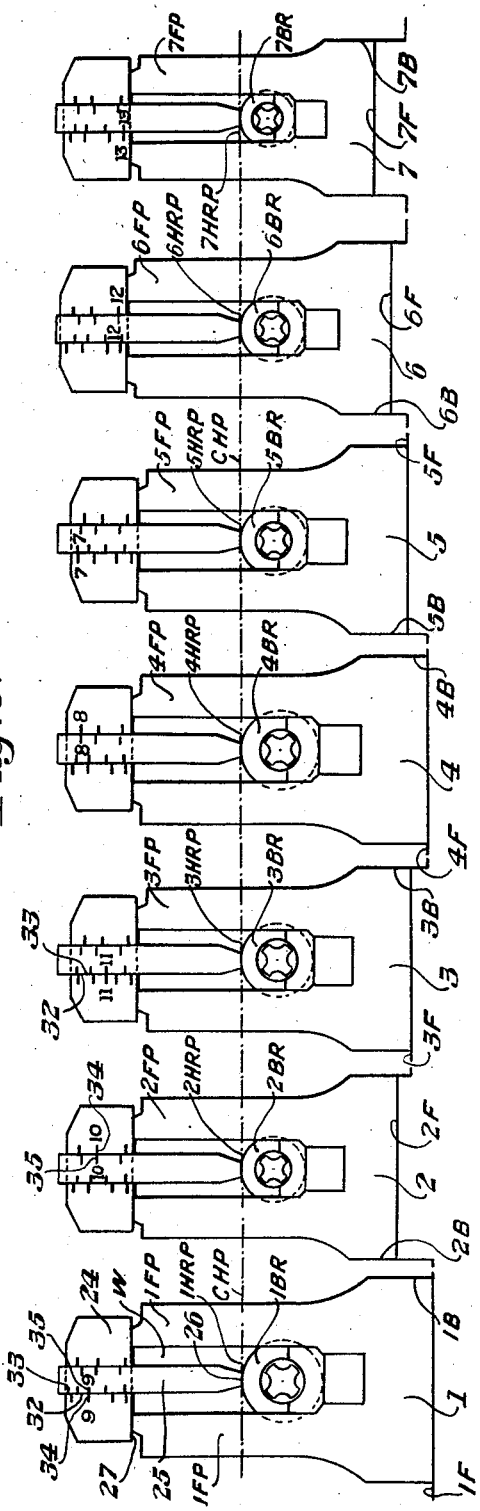
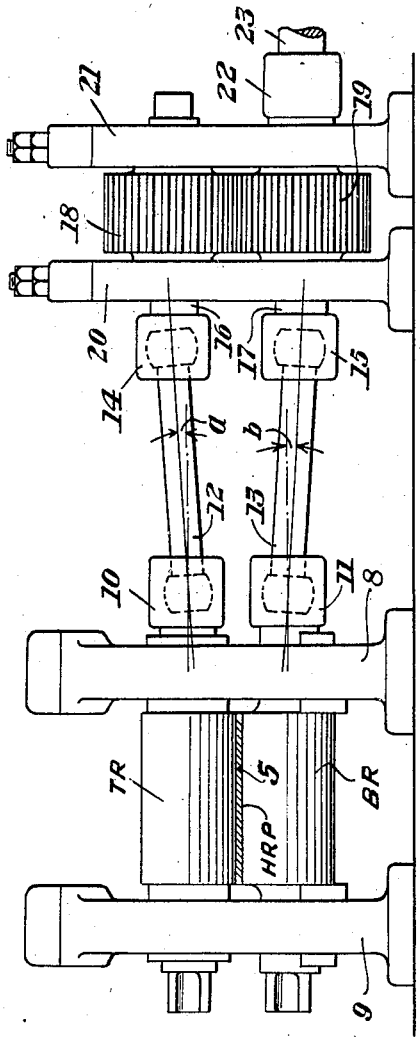
INVENTOR
HAROLD T. FARR and
ROBERT A. PETERSON
by John E. Jackson
their Attorney Patented Dec. 26, 1944

2,365,944

UNITED STATES PATENT OFFICE 2,365,944

METHOD FOR ALIGNING ROLL PASSES

Harold T. Farr, Cleveland, and Robert A. Peterson, Cleveland Heights, Ohio

Application August 5, 1942, Serial No. 453,710

1 Claim. (Cl. 80—56)

This invention relates to an improved method and apparatus for gauging or setting a plurality or series of mill rolls.

One of the objects is to establish a line of pass in a common horizontal plane, for a series of rolls in a series of roll stands, particularly under conditions of replacement, repair, or changeover of one or more rolls in a series of roll stands.

A further object is to provide a gauge which may serve as a single unitary instrument, indicating by suitable indicia on a single scale the relative but yet precise setting of any roll in a series of roll stands, in order to maintain the horizontal pass through each in a common horizontal plane. The calibration of the indicia on the gauge is distinctive in the sense that the indicia does not follow any uniform or regular marking on a graduated scale.

The indicia employed are more in the nature of an empiric reference point, in its relation, however, to a reference line or point located in a generally similar environment for each of the mill roll stands; but varying slightly and specifically in a characteristic manner for each roll and roll stand, as influenced and determined by such factors as the degree of wear and particular size of the roll and the particular height, type and character of the stand, frameposts, housing, bed plate, and foundation. It is a point of importance that in the present method and apparatus, one of the points of reference employed in empirically establishing the pair of indicia markings includes the rolling face or pass of one of the rolls when it is in a common horizontal plane with the horizontal roll passes of other roll stands through which the stock passes. In distinguishing contrast it might be pointed out that if some other common reference plane or point were taken—such as the center or axis of one of the rolls, top or bottom—no reliance could be placed upon any pair of empiric indicia reference marks thus determined, because of possible varying factors such as variations in the diameters of the various rolls of the different roll stands. One of the reasons for the possible variation of the diameter of the various rolls is the customary practice of dressing or refinishing the rolling face or surface after a roll, (either new or previously dressed) has been worn; or, if the effective rolling face has for any one of a number of reasons become uneven or out-of-true alignment, due to soft spots causing differences in wear, or due to uneven heating causing strains which may result in an uneven or out-of-true rolling surface.

The method and apparatus of the present invention is of such a character that while extremely simple and practical, it takes into account and provides for all of the various factors when the mill operator is setting up his mill. A change in the character of the particular metal stock may require a change of and realignment and setting of the rolls.

In the interest of dispatch, it is particularly desirable to provide a method and gauging means in setting up the rolls of a mill, that involves the least possible delay and interference with the actual production and rolling schedule.

Another factor to be considered in the setting of the rolls in the series of roll stands is one relating to the power drive of the rolls, from the gear pinions in the series of pinion stands. A pinion stand is provided as a means for driving the rolls of the roll stand through the medium of a spindle and universal joint and coupling drive connection. The drive pinions usually are provided with mountings and bearing supports having a fixed center distance between the pinions. On the other hand, in order to provide for an adjustable thickness of the metal stock and the amount of reduction, it is necessary that the distance between the roll centers be made adjustable. Dependent upon the particular conditions and circumstances of operation, the adjustable or varying distance between the centers of the rolls introduces a more or less varying degree of eccentricity between the roll centers in the roll stand and the drive pinion centers in the pinion stand. From the operating and driving standpoint, it is at all times desirable to so drive the rolls from the pinions that the eccentricity between the roll centers and the pinion centers is uniformly balanced and distributed, or is equally divided. Such an arrangement contributes toward a balanced and uniform transmission of power forces, and tends to minimize excessive wear and friction on parts which otherwise might be subjected to excessive and unbalanced loads and forces.

Closely related to this question of uniform balance and equalization and distribution of the load and accompanying forces incident thereto is the factor of the relation between the line of travel or the particular horizontal plane or line of travel of the metal stock with reference to the particular horizontal plane or pass between the upper and lower rolling surfaces or faces of the two rolls, upper and lower, respectively. From an operating standpoint, it is desirable to have the metal stock which passes between the rolls travel on a straight line or in a common horizontal plane as it passes between the rolls from one roll stand to another throughout the series. Such a straight line or common horizontal pass midway between the bottom and top rolling faces of the deforming rolls in each roll stand may be considered as a center line of the metal stock which is being deformed. When the metal stock travels in such a straight line, the ideal conditions for metal flow or plastic deformation by the roll passes are approached. If the metal stock departs from such a common horizontal pass line as it passes through the successive roll stands, it is likely that the metal stock may be drawn into frictional engagement with the guides which may deform the metal, but in an undesirable and inefficient manner. Any departure of the metal stock from the common horizontal plane serves to create an unbalanced load condition which tends to a non-uniform and uneven distribution of load on the upper and lower rolls, with a resultant unbalance in the loads carried by the respective related pinions.

It is a purpose of the present method and apparatus to effect a setting and adjustment of the rolls in a manner as nearly approaching the desired ideal conditions in practical operations as may be possible, with a minimum of time and effort and by the use of simple, inexpensive and rugged gauges which are not easily damaged or disarranged.

A further object of this invention is to provide a simple, rugged and inexpensive gauge to be employed in facilitating the practice of the method of setting all of the passes of a series of rolls carried on a series of roll stands, in a common horizontal pass plane.

A further object is to provide a gauge having a plurality of pairs of registering indicia indicating empirically the correct setting and position of each roll in a series of roll stands relative a common gauging or reference plane or point in each of the roll stands, in order that the roll pass of each of the series of roll stands may be positioned so as to be in a common horizontal plane, irrespective of variations in roll diameters, the height of stand-housing posts, and other variable factors which may be incident or peculiar to the different roll stands in the series.

A further object is to provide a gauge of the above character having a plurality of pairs of registering indicia so disposed on relatively movable gauging parts that the indicia may be clearly indicated, in a well and widely spaced arrangement, to avoid a cramping or crowding even though the different pairs of registering indicia may represent but minor differences or changes in adjustment between the relatively movable gauge parts.

One selected embodiment is shown in the accompanying drawings, for purposes of illustration, in describing the gauging means and also the method of aligning the top surface of the bottom rolls in a plurality of roll stands, so that the metal strip or stock material being rolled will lie within the same common horizontal pass line as it travels through the successive rolls in the series of roll stands.

In the drawings:

Figure 1 is a front elevation showing one form of the gauging means and illustrating the scale and registering indicia marks indicating the setting of the bottom roll in a plurality of stands, all contained on a single scale of a single gauging tool.

Figure 2 is a top plan view of Figure 1 looking down upon the top of the gauging tool and showing more clearly one means of effecting a slidable adjustable relation between the horizontal spanning member of the gauge and the vertically adjustable member.

Figure 3 is a broken fragment in front elevation, showing a bottom roll supported at its neck bearing ends in the spaced upright framepost of one stand, and illustrating the gauging tool having its ends supported on the upper ends of the posts of the stand frame, such a line or plane of support serving as a common datum line or plane, common to all of the roll stands, the vertical relatively adjustable member being shown in a position so that the lower end thereof is in contact with or tangent to the upper rolling face of the lower roll, the plane of such point of contact being in the same common horizontal plane as the corresponding part of the roll in each of the other stands of the series.

Figure 4 is a top plan view of Figure 3 showing more clearly a preferred disposition of the horizontal spanning bar, shown in a diagonal position, spanning the top gauging plane of the spaced bearing frameposts of a stand, so that the bottom edge of the vertically adjustable member of the gauge may be in gauging contact with the uppermost rolling face of the bottom roll. Of course, other suitable supporting points may be provided in spanning the spaced portion of the spaced frameposts of the stand. The horizontal spanning member of the gauge need not necessarily be disposed diagonally, but might be arranged parallel with the axis of the roll, it being important, however, that the lower feeler or gauging face of the vertically adjustable member of the gauge be in contact with or tangent to the uppermost portion of the circumference of the roll.

Figure 5 is an end elevation of Figure 3, but showing also the bottom connecting base of the stand frame supporting the two spaced frameposts of the stand. The gauging tool is shown diagonally disposed, with the lower end of the adjustable member in tangent contact with the top face of the bottom roll at a point directly above and in vertical alignment with the axis of the roll.

Figure 6 is a view in more or less diagrammatic form, with certain features in exaggerated relation, showing a series of seven roll stands, with a view of illustrating the practice of the method and the manner in which a common or single gauging means may be employed to adjust the top face of the bottom roll in each of the respective stands in the series, so as to occupy and assume a horizontal plane common to each one of the stands, even though the rollers may be of varying diameters, so that the axis of each of the rolls in their respective stands occupies different horizontal planes (as indicated in exaggerated form), and even though the foundation on which each of the respective stands is mounted may be out of alignment and occupy different horizontal planes, as indicated in exaggerated form in this diagrammatic showing. While a gauging tool is shown in each of the frames, it is understood that only a single gauging tool may be employed for a plurality of stands, the particular stand corresponding to a particular gauging, and adjustment of the roll height in such particular stand being identified by a suitable pair of registering or aligned identifying indicia markings on each one of the adjacent sliding edges of the relatively movable parts of the gauging tool.

Figure 7 is a front elevation in more or less diagrammatic form, showing a roll stand and a pinion stand, together with the manner in which the power is transmitted from a common drive shaft through the pinions of the pinion stand, wherein the pinion centers are fixed, and by suitable coupling and spindle connections, the power is transmitted to the pair of rolls in the roll stand, said rollers being relatively adjustable between the centers or the axes thereof.

As shown in Figure 6, a plurality of roll stands, designated generally as 1 to 7 inclusive, are shown mounted on the foundations, designated generally as 1F to 7F inclusive, the various levels of the various foundations on which the roll stands are mounted being shown out of alignment in exaggerated form or relation, for purposes of illustration only. In actual practice, the base or foundation on which the various stands may be mounted would undoubtedly be more nearly in the same horizontal plane, but yet there may be some slight variation or unevenness in the various foundations. Each stand as shown comprises a base, designated as 1B to 7B inclusive, and a plurality of spaced upstanding frameposts, designated as 1FP to 7FP inclusive. Suitable bearings are provided in the stands for supporting the opposite neck bearing ends of a bottom roll in each stand, designated generally as 1BR to 7BR inclusive. The various rolls, together with other parts and rolls, as heretofore stated, have been shown in slightly exaggerated form for purposes of emphasis and illustration. For example, the bottom roll 1BR, as shown, is much larger in diameter than the bottom roll 7BR in stand 7, and the bottom roll 4BR in stand 4 is shown as being of larger diameter than bottom roll 2BR, but yet of less diameter than roll 1BR in stand 1. The significance of this in the practice of the method of aligning the top face of the bottom roll by a suitable gauging means, so as to bring the top roll face of the bottom roll to a common horizontal plane for every one of the rolls of the series, is that the same result and advantage could not be obtained by attempting to align the axes of each of the rollers of the respective stands in a common horizontal plane, because to merely align the axes or centers of the various rolls in each stand of the series would not take into account a condition met in actual practice, wherein there usually exists a difference in the actual diameter of the rolls due to various conditions of wear, or because certain rolls may have been turned down to restore a suitable rolling surface, to a greater extent than others. While the difference in diameters of the different rolls may be relatively small and measurable in hundredths or thousandths of an inch, such a slight difference in the diameters of the various rolls would preclude a method of alignment in which the axes of the respective rolls were brought into horizontal alignment on any other part of the roll other than the actual effective functioning portion of the roll surface, when the strip or stock material is fed through the roll so as to be subjected to the rolling operation.

Of course, in practical rolling operation it is necessary from time to time to remove the rolls, either top or bottom, of each of the respective stands, to turn them or subject them to other necessary operations in order to restore the surface to suitable condition or for some other reason of replacement or repair. It is a difficult and time-consuming operation to remove the rolls in any single stand, and to adjust and set the rolls in each of the roll stands in the series so that the upper rolling face of the bottom roll will occupy and assume a horizontal plane for the strip or stock material being rolled, in common with the top of the bottom roll in each of the other stands. Various expedients have heretofore been resorted to but, so far as is known to us, no one has heretofore employed a single common gauging means which is mounted in a single or similar position or plane in each of the roll stands, such a plane serving as a datum or base line from which the gauging or adjustment of a gauging tool is made, to determine the exact position of the upper face of the bottom rolls, and so that such a single gauging means shall by itself serve as a means of indicating the relative differences or similarities in the setting of the rolls in each of the respective stands.

The gauging tool or means which may be employed to facilitate the practice of certain steps of the method, may assume various forms. As shown more clearly in Figures 1 and 2, the gauging means includes a plurality of members 24 and 25, arranged and disposed so as to be slidable and adjustable in right angular relation to each other; any suitable means, such as a bolt 30 and nut 31, being provided for permitting relative sliding relation between the parts, and to also hold the relatively adjustable parts in any desired fixed adjusted relation. As shown, one member 24 is shown as horizontal, and is provided with an accurate, well-finished bearing face or edge 27 which is adapted to rest upon a bearing face such as 36, at the top portion or face 36 (see Figures 3 to 5) or other suitable and convenient part of the frameposts FP of the roll stands. As shown in Figures 3 to 5, the member 24 spans the two frame members of the stand, the ends of the horizontal member 24 being supported on the suitable bearing face 36 of the framepost. It is, of course, desirable that the bearing faces on the posts of the stands be of a smooth and suitable finish so that they may serve as an accurate datum or base line from which the gauging may be done. Of course, if this method is generally adopted, the stands may be provided with means either as part of the original stand, or as fixtures or accessories applied thereto, whereby a very accurate gauging face or base plate 36 may be afforded as a bearing face for opposite ends of the horizontal member 24 of the gauging means.

The gauging means also includes a means suitably arranged and disposed relative the horizontal spanning member 24, so that the distance from the common base or datum plane or line to a point tangent with the top surface of the bottom roll may be accurately determined, in order that such tangent point of each of the bottom rolls in the series of stands may be brought to and occupy a common horizontal plane. This plane in general would correspond to the plane in which the strip or stock material would travel in going between the rolls from one stand to the other of the series.

Referring more particularly to Figures 1 and 2 (see also Figures 3 to 5 inclusive) a member 25 is shown disposed substantially centrally of the spanning member 24, and is arranged substantially normal or at 90° to the edge or face 27, which constitutes the bottom bearing face of the horizontal member 24.

Various arrangements may be employed, as above noted, for mounting the member 25 in adjustable relation with respect to the spanning member 24. As shown, the member 25 slides within a slotted recess 28 in one face of the spanning member 24, and is disposed substantially centrally thereof. Preferably, the side edges of the slot are beveled to accommodate the tapering or beveled edges 29 on opposite sides of said member 25, so that there is formed between the spanning member 24 and the member 25 adjacent sliding edges 32 and 33 respectively, along which adjacent sliding edges, pairs of identifying marks or indicia may be disposed and arranged in registering relation to correspond with the setting and gauging operation for each of the bottom rolls in the series of stands. For example, as shown in Figure 1, the pair of registering marks 34 and 35 adjacent the edges 32 and 33 respectively on the spanning member 24, and the sliding member 25, have the identifying number 7—7 arranged in registering relation and would represent the setting of the gauge in stand number 5 of Figure 6, in order that the bottom gauging edge or face 26 of the slide 25 may be brought in tangent relation with the top surface of the bottom roll 5BR, so that such point of tangency will lie in a common horizontal plane with the corresponding points of the bottom roll of each of the other stands in the series. In a corresponding manner the other pair of identifying indicia markings, such as 8—8 to 13—13 inclusive, would represent the correct position for the top face of the bottom roll in each of the respective stands of the series, in order to bring such points in a common horizontal plane, as above indicated and as more clearly indicated by the dot and dash horizontal line CHP (common horizontal plane) in Figure 6.

One convenient means for facilitating relative adjustment between the spanning member 24 and the slide 25 is to provide a slotted portion 37 in the head of the slide 25 through which slotted portion the shank of the bolt or screw 30 may pass. The parts may be held in relatively fixed relation by tightening a nut portion, such as a wing nut 31, upon the threaded portion of the bolt 30.

Preferably, the arrangement of the pairs of registering identifying marks or indicia on the two relatively movable parts 24, 25, respectively, of the gauge, is not in regular adjacent sequence relation on one side of the slide. Both sides of the sliding member 25 are employed in order that the markings, particularly when there is but a slight distance between linearly adjacent markings, may not be too crowded. Such a staggered relation enables the pair of identifying and registering marks to be readily located. As shown, the various pairs of registering identifying marks represent an empirical calibration, corresponding to a condition in which it is definitely known that the top face of each of the bottom rolls in the series of stands occupies a common horizontal plane. Thereafter, if in any one of the stands of the series it is necessary to remove or change the setting of the top or bottom roll for purposes of replacement, repair, or for other reasons, it is apparent that with the employment of the present gauging method, and by the use of the gauging tool, the correct positioning and adjustment of the bottom roll, readily and accurately may be made in replacing the rolls. The above statement would hold true with reference to any stand in the series in which it was necessary to change the adjustment, or remove and replace either the top or bottom roll. Further realignment of all of the bottom rolls would not be required, in order to feel assured that the top face of the bottom roll in each series occupied a horizontal plane corresponding to that of the bottom roll in each of the other stands of the series.

In practical operation, the distance between the axes or centers of the upper and lower rolls in the roll stand is adjustable to accommodate for wear or dressing of the rolls from time to time, and also to meet the requirements of the particular material which is being rolled. The rolls are driven in a conventional manner by driving spindles 12 and 13 (see Figure 7) and coupling boxes or housings 10, 11 and 14, 15 from a pair of driving pinions 18 and 19, one of the driving pinions 19 being driven directly by a main drive shaft or spindle 23 through a housing coupling 22. The distance between the center lines of the pinions 18, 19 mounted in the pinion stands 20 and 21, is fixed. Any vertical adjustment or movement of one of the rolls in the roll stand will vary the angle between the center line of the driving spindle and of the roll. An ideal driving condition would be one in which the angle A between the center line of the upper roll TR and the center line of the connecting spindle 12, and the angle B between the axis or center line of the bottom roll BR and the center line of the lower pinion spindle 13, are equal. Where the two angles $a$, $b$ are substantially equal, ideal driving conditions are obtained in which the driving forces on the bearings, pinions, and connecting spindles and couplings, are substantially balanced and equally distributed. Apart from a mere adjustment of the top or bottom roll to meet the requirements of the material or metal stock of a particular order, a redressing or turning of either one of the rolls would be another factor which would affect the vertical adjustment and setting of the rolls. This latter factor would also vary the angles $a$, $b$ above referred to. Of course, the setting of the rolls to approach the ideal and desirable driving conditions above referred to, would be one of the variable empirical factors which would have to be taken into consideration in determining the initial position or plane of the strip material which is being rolled and which, in accordance with the present invention, is determined by the method of gauging and the means which is employed, in order that a point tangent with the upper rolling face of the bottom roll in each stand of the series may occupy a common horizontal plane, as hereinbefore fully explained. Another way of expressing the thought from an operating standpoint is to state that it is desirable to have the metal which passes between the rolls travel on a straight line from stand to stand. This straight line may be considered as a center line between the bottom and top deforming rolls in each set of rolls where the steel is being deformed. When the strip material travels on this straight line, an ideal condition for rolling is more nearly approached by having the deformation made by the roll passes rather than having part of the deformation effected by means of guides or parts other than the rolling pass. This is sometimes the case in improperly adjusted rolls, and particularly under conditions wherein the roll passes between the pair of rolls in each stand of the series are not brought to a common horizontal plane.

In Figure 7 the metal stock or strip material being rolled is designated as "S," and is shown in section between the top roll TR and the bottom roll BR which rolls have their end bearings supported in the stand frames 8, 9. Of course, the common horizontal plane for the metal strip material passing between the rolls might be defined with reference to the strip material as being the horizontal center line of the metal strip material. Of course the horizontal plane or center line of the metal strip material being rolled would be determined by, and directly related to, the plane or point tangent to the top face of the bottom roll. As previously indicated herein, such a common horizontal plane, with reference to the bottom roll in each stand in the series, is empirically determined with reference to all the variable points in the roll housing and pinion housing, when setting up the apparatus initially, in a particular mill including a particular series of stands. In this manner, the exact location of the common horizontal plane is initially attained as a reference plane, relative to the base datum plane on each stand frame on which the base 27 of the gauge rests. This plane might be referred to as an ideal condition which is sought to be approached in practice.

The roll-setting gauging means hereinbefore described has the registering marks upon its relatively slidable members, so that it is only necessary that the operator of the particular mill stand place the horizontal member 24 of the gauge across what might be designated as the housing window W, and then raise the bottom roll of each housing until the top face of the roll touches the bottom feeler face 26 of the vertical member 25 of the gauge. The housing window W might otherwise be defined as including the open space between the spaced upright posts of the frame. The predetermined registering notations or markings identifying a particular stand of the series on the adjacent sliding faces of the gauge, provide a means for assuring a substantially ideal setting of the top face of the lower roll of each of the stands in the series, in a common horizontal plane.

While reference has heretofore been made to the provision at the top portion of the frame posts FP of the various stands of a common base or datum line, it is understood that the top of the frame posts, or the plane chosen as the datum or base line for that particular stand, may not be in the same plane, or at the same height as the base or datum line of each of the other stands. However, such a circumstance will be immaterial and will not affect the accuracy of the setting because the registering indicia or identifying marks are made on the adjustable parts of the gauge when the gauge parts are in position and so adjusted that the feeler gauge face 26 is tangent with the upper face of the bottom roll, and the base 27 of the horizontal member 24 of the gauge occupies the position of the base or datum line of that particular stand of the series.

While one selected embodiment of the gauge has been shown and described herein for purposes of illustration, it is understood that various changes and modifications in detail may be made without departing from the spirit of the invention as defined in the appended claim.

We claim:

The method of aligning the horizontal roll pass of a plurality of stands of rolls in a common horizontal plane, which method consists in initially establishing as a gauge line or reference point the tops of the mill stand posts, determining the distance from the gauge line of each stand to the upper surface of the bottom roll thereof to bring about the condition of material travel in a common horizontal plane, providing a gauge having two members adjustably secured together at right angles, the first member being adapted to be placed upon and to span the distance between roll stand posts at opposite ends of the bottom roll and the second member projecting from approximately the center thereof, calibrating said gauge and placing on the two members thereof cooperating identical indicia for the correct setting of the bottom roll of each roll stand, said indicia showing when the second gauge member projects from the first gauge member a distance equal to the predetermined distance from the gauge line in each roll stand to the upper surface of the bottom roll thereof and bringing the bottom roll of each stand to the proper relation to attain travel of material in a common horizontal plane by performing the following steps on each roll stand: setting the gauge with the first member on top of and spanning the distance between two mill stand posts at opposite ends of the bottom roll, setting the lower end of the second gauge member at the proper distance from the first gauge member predetermined for said particular mill stand by means of the cooperating identical indicia, and adjusting the bottom roll by bringing the upper surface thereof into contact with the end of the second gauge member.

HAROLD T. FARR.
ROBERT A. PETERSON.